United States Patent [19]

Rugg

[11] 4,057,953

[45] Nov. 15, 1977

[54] TRIANGULAR LAWN RAKE

[75] Inventor: William P. Rugg, Greenfield, Mass.

[73] Assignee: Rugg Manufacturing Company, Greenfield, Mass.

[21] Appl. No.: 686,583

[22] Filed: May 14, 1976

[51] Int. Cl.² ............................................. A01D 7/00
[52] U.S. Cl. ................................................. 56/400.17
[58] Field of Search .............. 56/400.17, 400.18, 400.1

[56] References Cited
U.S. PATENT DOCUMENTS

| | | |
|---|---|---|
| 1,500,441 | 7/1924 | Congable .......................... 56/400.17 |
| 1,887,480 | 11/1932 | Horstman ......................... 56/400.17 |
| 1,909,754 | 5/1933 | Carlson ............................ 56/400.17 |
| 2,321,489 | 6/1943 | Kaufman .......................... 56/400.17 |
| 2,413,827 | 1/1947 | Herst ................................ 56/400.17 |
| 2,488,802 | 11/1949 | Canalizo .......................... 56/400.17 |

Primary Examiner—Russell R. Kinsey
Attorney, Agent, or Firm—Robert A. Townsend

[57] ABSTRACT

A triangular-shape lawn rake achieving a straight edge with teeth of uniform length; having a unitary, flat sheet teeth-handle joining socket head; and having resilience and stiffness in proper combination and without sacrifice of low cost or light weight.

13 Claims, 6 Drawing Figures

TRIANGULAR LAWN RAKE

BACKGROUND OF THE INVENTION

This invention relates to lawn rakes, and more specifically to broom-type rakes having teeth of either bamboo or spring steel construction.

The problem in lawn rake design is to provide, in combination:

1. Terminating of the rake teeth on the same straight line transverse to the rake axis, and with all of the teeth simultaneously engaging the surface to be raked across the full spread of the rake teeth, so that the tool may rake cleanly from and close against a laterally straight vertical edge or surface, such as of a structure, wall, curb or garden; and so that through no matter what angles or attitudes it is swung or side-stroked, the rake maintains full ground tangency without either ground digging by the teeth at the center of, or ground-clearing of the teeth at the sides of, the teeth spread.

2. Duplicate or uniform length teeth, so the rake requires but a single same tooth specification or length.

3. Separate or individual tines or teeth, that are unsplit, untwisted and unturned, and fabricatable equally of bamboo or steel.

4. Teeth-handle joining without thinning, splitting, twisting or drilling of the teeth, and with flat planar arraying as opposed to overlapping or bunching of the teeth at the apex of the spread.

5. Integral constructing and flat-forming of the teeth-handle socket head, and extending of the socket head or partial sheathing thereby of the teeth, for stiffening but not fracture-inducing of the teeth some distance away from their handle ends and equi-distantly from their working ends, but without resort to means external to the flat fastening.

6. Durability of the teeth-handle fastening, and more particularly provision of a rugged, integral socket head securing without weakening either the handle or the teeth.

7. A proper balance in the teeth spread of flexibility or resilience with stiffness.

8. Capability of manufacture at low cost and with a minimum number of parts and manufacturing steps.

Broom type lawn or leaf rakes such as here concerned are still principally of the half century old design of U.S. Pat. No. 1,989,815, which does not solve the problem, failing as it does to supply any of the foregoing requirements in full measure. More particularly, the design of U.S. Pat. No. 1,989,815 has an arc-fan instead of the wanted "A" or triangular shape of teeth spread; requires the use of split strips; bundles and weakly clips the strips to the handle at the teeth apex; employs a teeth stiffener which is weakly attached to the handle; causes fracturing of the teeth at their strip-split junctures; and engages the teeth at non-uniform distances from their working ends. And as indicated in U.S. Pat. No. 2,018,311, with this design the stiffening of the teeth away from the handle requires the use not only of the usual cross bar, but also the use of an additional wire coil stiffening device.

A more durable, relatively flat teeth-handle mounting has been achieved with metal teeth rakes such as of U.S. Pat. Nos. 2,137,795 and 2,316,168, but this has required twisting and turning of the teeth in a cost-adding way not attainable with bamboo, and has required further the addition to the rake structure of a heavy, cumbersome, costly, spring stiffener assembly that precludes compact stacking and storage.

Various attempts have heretofore been made with bamboo teeth rakes as well, to supply the wanted durable, flat or co-planar teeth-handle fastening, such as illustrated by U.S. Pat. Nos. 1,880,580; 2,007,609; 2,040,205; and 2,321,489. But these latter designs have all been unsuccessful, or rejected by the art for their failing each to supply several other of the foregoing requirements.

Thus none of this latter group of patents supplies the wanted "A" or triangular tooth spread shape, all employing instead the conventional arc-fan. And in all cases the teeth-handle mounting is an ungainly, cumbersome contrivance that denies the proper balance of resilience with stiffness, that lacks the wanted yielding support of the teeth away from their inner ends, and that lacks the required form of handle receptacle, for durable, co-planar connection without drilling of the same.

There have been other attempts at improving on the unacceptably weak teeth-handle mounting of U.S. Pat. No. 1,989,815, such as of U.S. Pat. Nos. 2,122,359; 2,497,192; and 2,519,714, but these have all retained the unwanted teeth overlapping and bundling at the apex, and have failed to supply the straight transverse line of the teeth, or the stiffening by the socket of the teeth sufficiently away from their inner ends, and have required splitting both of the teeth and of the handle, or involved weak, fracture-causing pin mounting of the handle and teeth stiffener.

Thus, this invention originally and uniquely solves the stated problem, and more particularly is the first and only to supply each and every of the above enumerated lawn rake requirements.

BRIEF SUMMARY OF INVENTION

A lawn or grass and leaf rake of "A" or triangular shape teeth spread; having a flat or unbundled mounting or joining of the teeth to and co-planar with the handle; utilizing uniform length, essentially unmodified teeth; supplying wanted stiffening support of the teeth away from their inner ends without resort to additional means therefor; and achieving wanted durability and flexibility-stiffness balance at low cost and with good appearance and light weight.

BRIEF DESCRIPTION OF THE DRAWINGS

In the accompanying drawings illustrating a preferred embodiment.

DETAILED DESCRIPTION OF THE INVENTION

The invention comprises a plurality of like or identical bamboo or spring steel tines or teeth 10 having uniform length backs or bodies 11, and equal height, downturned working ends 12. The teeth 10 are entirely separate, of identical or unreduced thickness from end to end, and also of unvarying or unmodified width over their exposed length. The teeth thus essentially are free from weakening and manufacturing-cost-increasing splitting, thinning, drilling and the like, and free also from bamboo-manufacture-precluding about-axis twisting, or in-plane bending.

Figure 4:
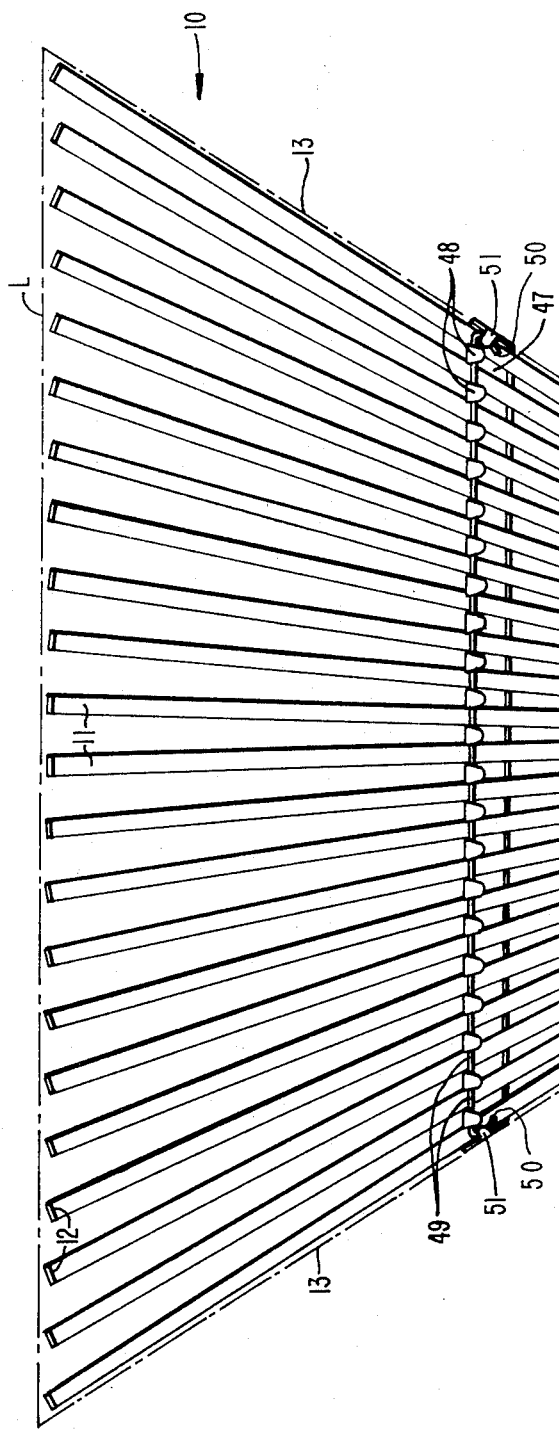
FIG. 4 is a bottom plan of the rake teeth, spreader bar, and socket head, with parts broken away to show the constructional details.
Figure 5:
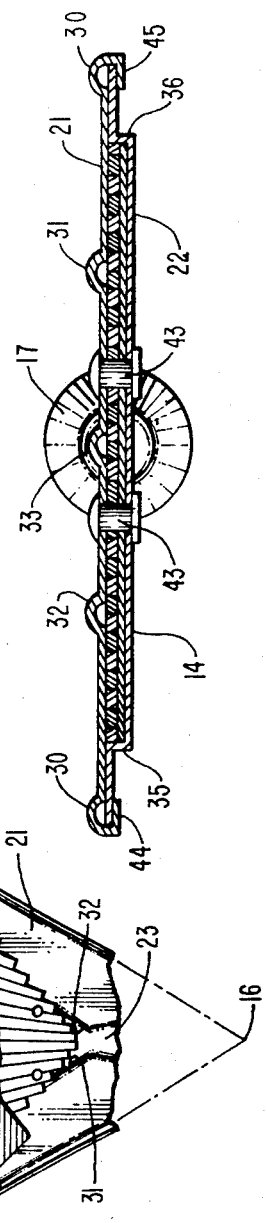
FIG. 5 is a transverse section on an enlarged scale along the line 5—5 of FIG. 1.
Figure 6:
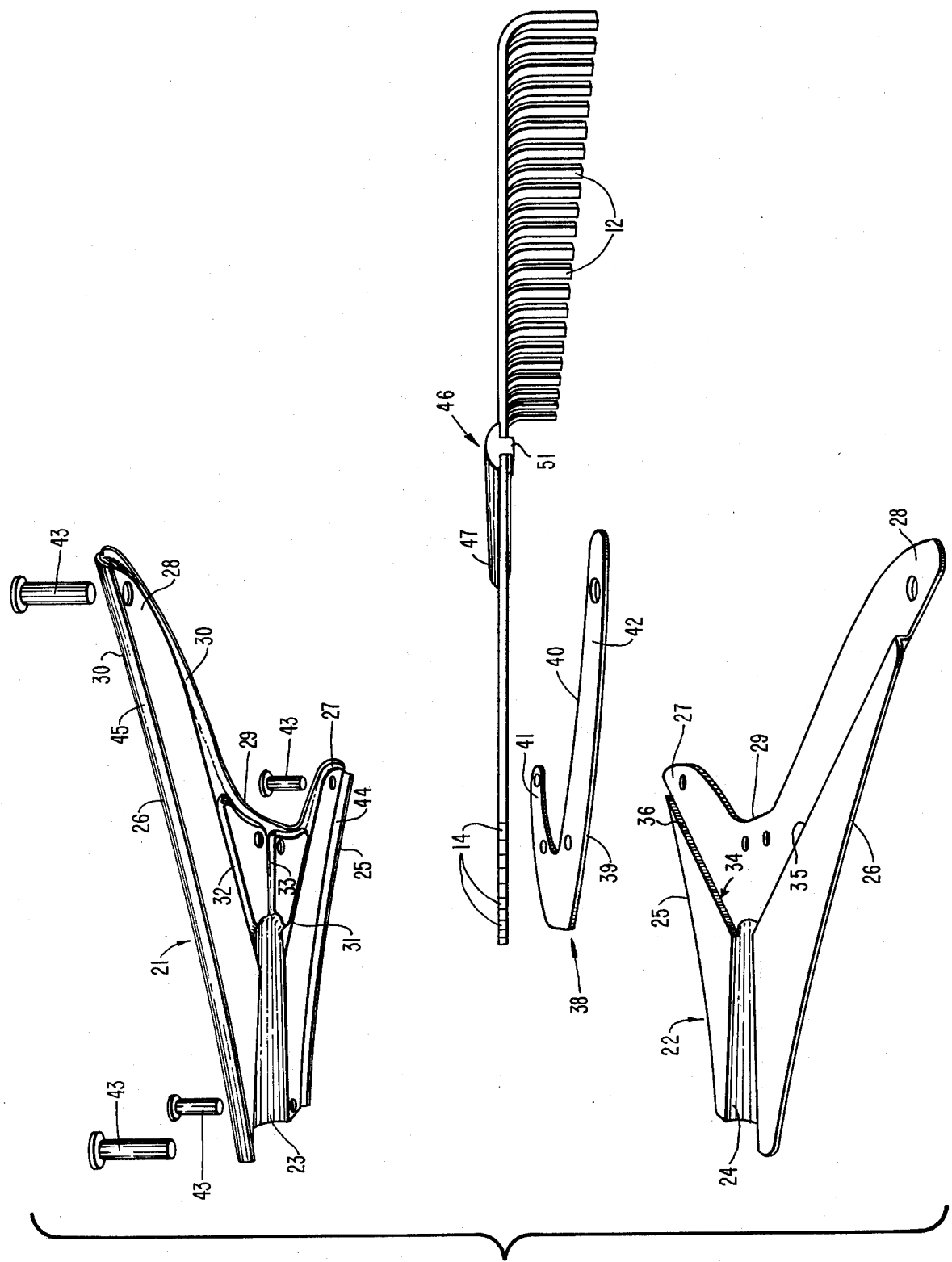
FIG. 6 is an exploded view in perspective of the teeth, spreader, top and bottom socket head plates, cardboard insert, and rivets of the invention rake.

The teeth 10 are arrayed in an entirely flat or co-planar "A", or straight sided or triangular shape or spread 13, FIG. 4, as contrasted with the conventional non-straight ended or arc-fan shape or spread. With all of the teeth 10 terminating on the same straight transverse line L, and extending co-planarly so their uniform height working ends 12 are all tangent as well to the same horizontal plane or surface, the invention rake has the wanted capability of raking cleanly from and close against a laterally straight, vertical edge or surface, such as of a structure, wall, curb, or garden. In addition, the rake hereof may be swung or stroked by users of every size or height and through whatever angles or attitudes of use or manipulation, with retention through all said angles of full ground tangency, and absence in all said attitudes of either ground digging by the teeth at the center of, or ground-clearing of the teeth at the sides of, the teeth spread 13.

The providing for entirely separate teeth 10, and having backs 11 of generally uniform cross section, and fabricated without splitting or twisting or bending or thinning or drilling, is the achieving of teeth that are most inexpensively formed, have maximum strength, and are free from life-shortening weak points. Utilizing teeth that are identical, or of uniform back 11 length and working end 12 height, further eases the manufacture, and lowers the cost, of the invention rake.

The utilization of duplicate tines or teeth 10 occasions also the terminating of the inner ends 14 of the teeth, considered from the center outward to the opposite side margins of the spread 13, at gradually increasing distances from the apex 16 of the "A" shape or triangular teeth spread 13.

The rake teeth 10 are securely fastened to a handle 17 through a rigid, compact, light weight socket head 18 having an integral receptacle 19 for co-planar mounting therewithin of one end of the handle 17 and without splitting or other weakening or cost increasing modification of the same, other than one end tapering to the receptacle's cone shape, thus providing rigid socket interfitting with sufficient lengths of handles whose socket-external portions may be of various cross sections, and which may be secured by receptacle indents 20 or the like.

The teeth-handle fastening socket head 18 comprises generally flat, mating or interfitting, sheet steel top and bottom members or plates 21, 22, each formed centrally axially with a half round, cone-shaped depression or handle receptacle half 23, 24.

In plan the top and bottom socket head plates 21, 22 have mating, generally fish tail configurations, with like-flaring sides 25, 26 closely encompassing the outermost of the diverging teeth 10, and with, at their teeth receiving ends, opposite-side wing portions 27, 28 whose end or transverse web margins turn or curve inwardly to an inset, oppositely bowed or concave intermediate portion 29.

The top or female socket head plate 21 is stiffened, or formed out-of-flat, by its receptacle half 23, and in addition by a bead or rolled edge 30 all around its side and tooth end periphery 25-29. Said top plate 21 further has like indenting stiffening ribs 31, 32 diverging oppositely from near the inner end or rounded point of its receptacle half 23 to merge with the inward curving margins of the wings 27, 28, and like indenting central axial rib 33 extending between said end or point of receptacle half 23 and the mid point of the intermediate plate end portion 29.

The bottom or male plate 22 of the socket head is, apart from its handle receptacle half 24, generally flat but bi-planar, through being reversely bent intermediate its handle and teeth receiving ends to form thereat a vertical step or shoulder 34 of angled or V form, and whose straight sides 35, 36 converge from the plate sides 25, 26 to intersection with the handle receptacle half 24 near the aforesaid rounded end or point thereof, thus defining between the sides 35, 36 an angle of, say, approaching 90°, as contrasted with the triangle 13 apex 16 angle of, say, 60°.

Under the invention, the step 34 is a rough guide or approximate stop for the rake teeth 10, whose inner ends 14 together have thereacross the indicated bell-shaped curve contour or profile when, being identically of the proper, say about 15 in. length, they are converged from wanted spacing along the line L so as to lie between sides 25, 26, of plates 21, 22 of wanted or suitable size and shape. It is found that, in order to fit the teeth inner ends within sides 25, 26 of a plate socket of suitable, pleasing proportions, and to avoid adding unnecessary bulk and weight to the rake, the aggregate width of the teeth inner ends needs to be reduced by the indicated tapering or feathering of said teeth inner ends. The tapering is only of teeth portions or lengths lying entirely within the socket head 18, and so does not affect the strength either of the teeth or of the rake. The tapering is also a simple manufacturing step that does not significantly affect the cost of the rake.

The socket head 18 further comprises a planar or flat sheet insert or template 38, which may be of relatively thin but stiff cardboard or the like, having an inner edge 39 conforming to the contour of sides 35, 36 of shoulder 34; an outer edge 40 conforming to the reverse curving or indented configuration of the plate wings and intermediate portions 27, 28, 29; and sides 41, 42 spaced apart and flaring or diverging correspondingly as the plate sides 25, 26.

In the assembly of the rake, the teeth 10, which are cut off shorter than they conventionally would be for overlapping at the spread apex 16, are instead laid flat, or side by side on and individually adhered or glued to the template 38, this with their inner ends laterally contiguous and, as they fall in the described bell-shaped pattern, being more or less longitudinally matched to the contour of the template inner edge 39, and with their working ends 12 spread or fanned out to the wanted spacing one to the next of say 5/8-¾ in.

Figure 1:
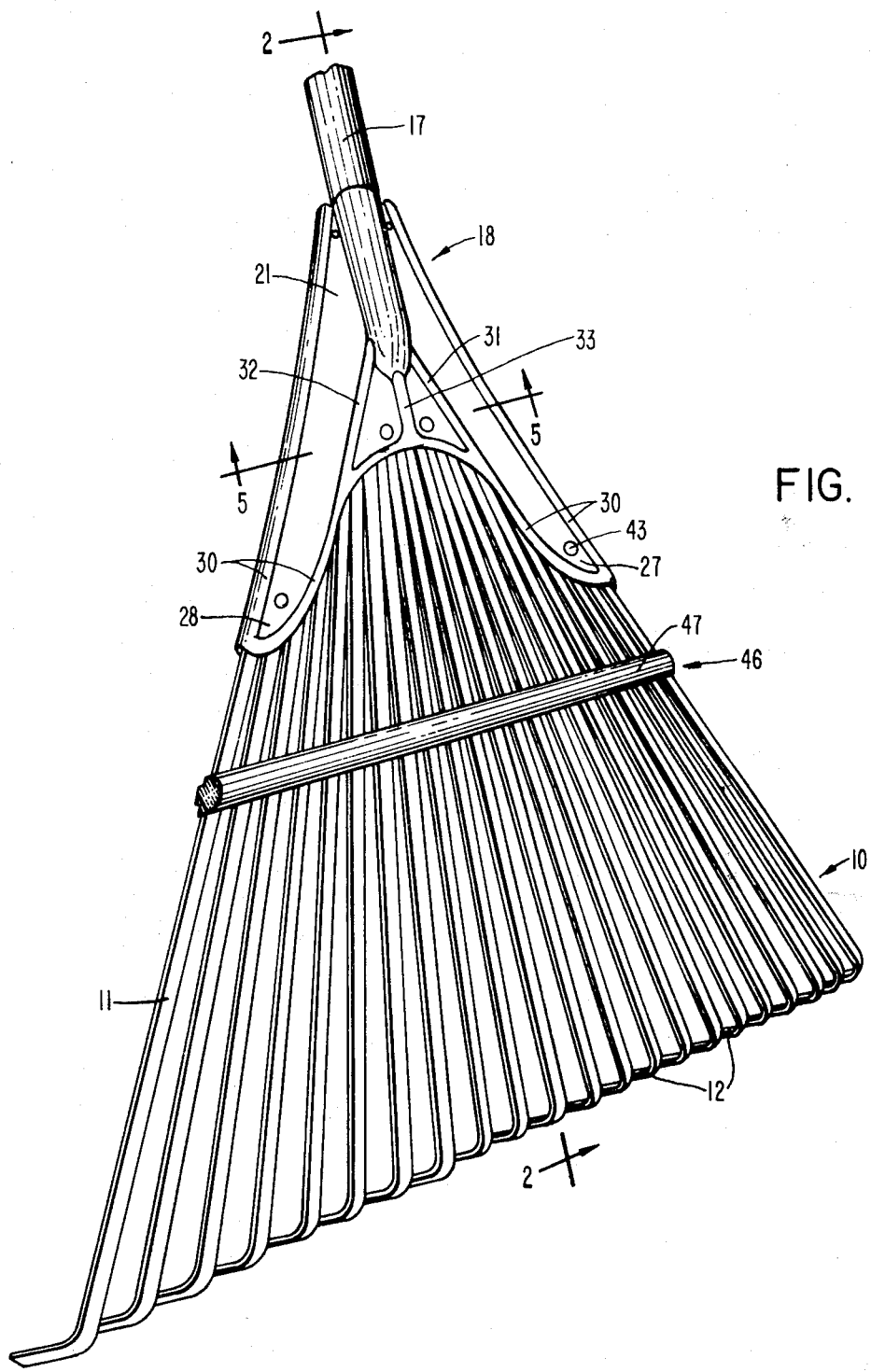
FIG. 1 is a top plan of the rake, with the handle broken off.
Figure 2:
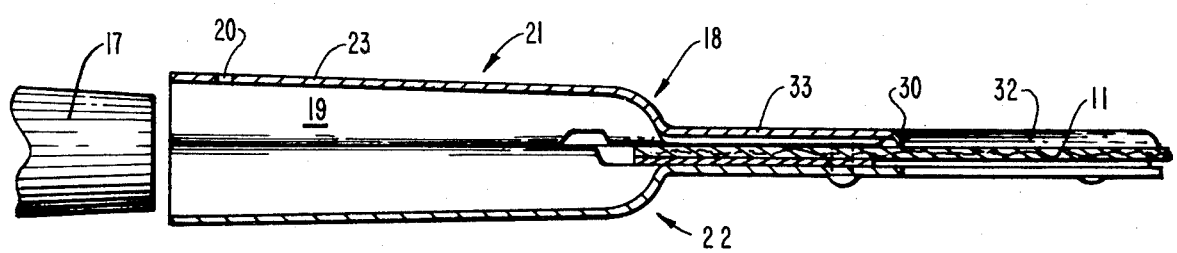
FIG. 2 is a vertical section on an enlarged scale along the line 2—2 of FIG. 1, with the handle removed.
Figure 3:
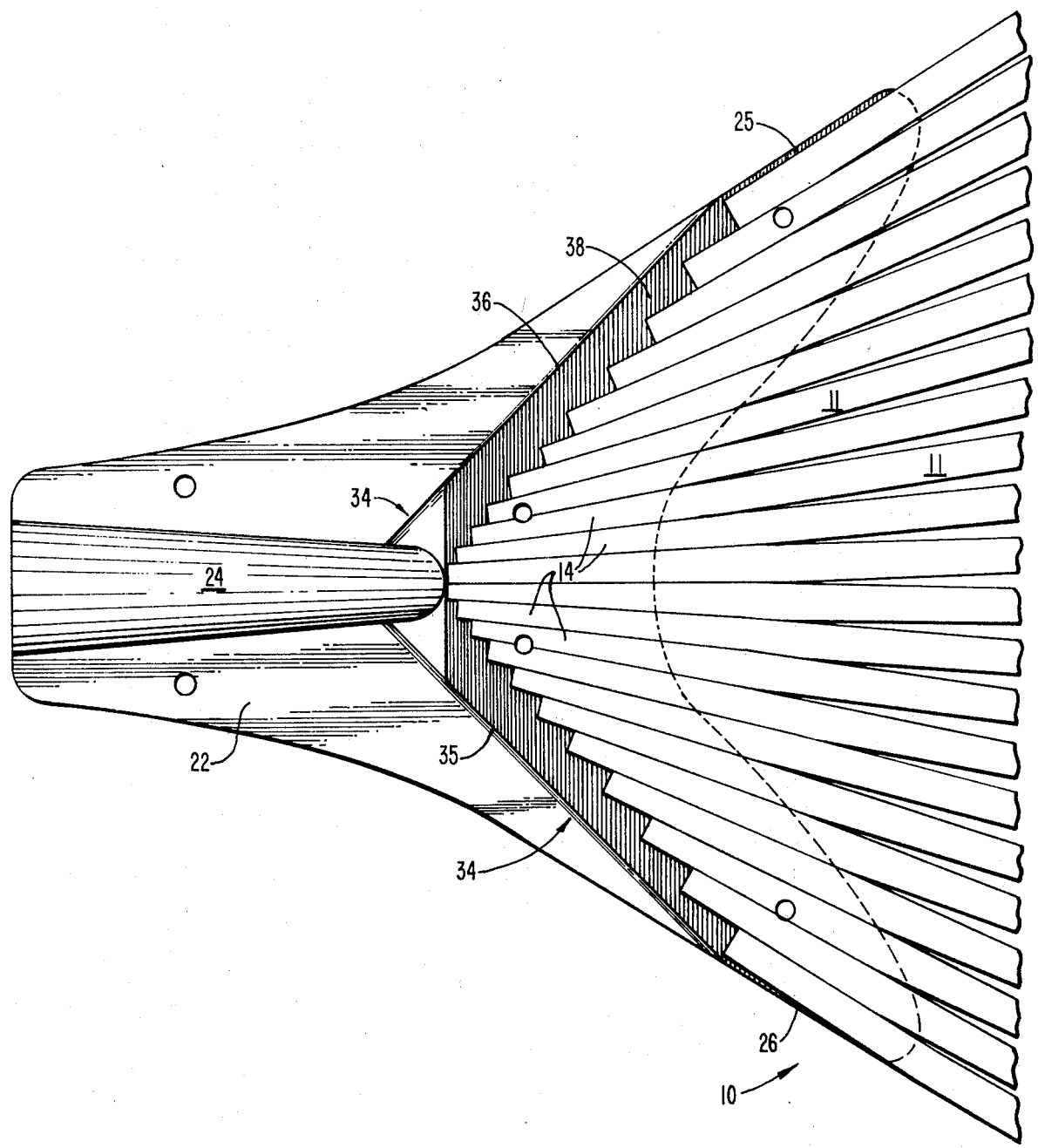
FIG. 3 shows the inside or inner face of the bottom or male member or plate of the socket head, and the rake teeth and cardboard insert as applied thereto.

The teeth spread 13 and template 38, as thus now integrally or monolithically associated or united, are then positioned as shown, FIG. 3, flat against the bottom plate 22 and its shoulder 34, with the template 38 conformant to and therefore snug against said shoulder 34, and with the teeth inner ends 14 being thus inserted about 2 in. into the socket head 18. The top and bottom plates 21, 22 are then matingly clamped to the opposite sides of the spread 13 and template 38 sub-assembly, and secured together, as by rivets 43, at a suitable number and spacing of points, such as herein the two diametrically opposite points near the handle end, and the four points spaced along the wing and intermediate portions 27–29 of the teeth receiving end of the socket.

The top plate 21 integrally extends at its downturned sides 25, 26 beyond the rolled edge 30 to form short tabs or webs 44, 45 which are then bent over the bottom plate 24 and crimped down against the outer or under side thereof as shown, thereby clamping or pinching the teeth 10 and template 38 between the thus integrated or united plates 21, 22.

Intermediate the webs 44, 45 the top plate rolled edge 30 extends downwardly over the template 38 to engage or closely approach the teeth 10, with the tabs or webs 44, 45 extending still further below the main plane of the plate 21 beginning at the outer edge of the outer most of the teeth 10, and extending from there to the handle-receiving extremity of the socket.

Under the invention, the winged or tine inner end enclosing or sheathing configuration of the socket, as well as the described shortcutting and flat, co-planar mounting of the teeth, leaves a reduced teeth length exposed or extending beyond the socket head of, say, around 12 in. The rake teeth 10, whether of bamboo or steel, being resilient, this considerable socket extent relative to, and for the same teeth working end 12 extent from, the conventional teeth inner end apex 16, uniquely imparts to the rake the wanted integral socket support for the teeth 10 intermediate their working and inner ends 12, 14, whereby the teeth are afforded the right combination of stiffness with resiliency.

Additional support for the teeth 10, and rigidity of their lateral spacing, is provided by a spreader bar or stress distributor bar 46 which may be either straight or slightly bowed in its transverse extent, and which has a domed or rounded back 47 affording it added rigidity lengthwise thereof, and teeth 48 extending downwardly from one long side between the rake teeth 10 and there curled or bent over a stiff teeth clamping wire 49 having in-turned ends 50 clamped under tabs or tongues 51 inturned from the ends of the spreader bar 46.

The spreader bar 46 laterally locks as well as distributes the stress on the teeth 10, and combines with the integral socket 18 to supply the wanted stiffness-resilience balance with the compact and light weight yet rigid and durable socket head construction of but two stamped and formed elements, subtracting significantly from the added materials and assembly cost, the extra weight, and the vulnerability to damage of the far more complex mechanisms heretofore required. The relatively light weight of the invention rake makes it much easier to handle, and useable over time with much less fatigue. The compact socket head design, with its co-planar mounting of the teeth, not only affords the rake a more pleasing or neater, lighter appearance, but also, in eliminating the conventional bulky, awkward bunching-together of the teeth by their overlapping at the apex, and/or the prior art external spring means for tine-stiffening, drastically reduces the bulk and cube of the rake transversely of the tine-plane, and thereby correspondingly the space or volume required for bundling or racking of the rake for shipping, storage and display.

Given that the socket head 18 is employed with tines 10 of appreciably less than conventional length, and extends in the tines directions about 2 in. from the tine inner ends 14 termination 34, when the spreader bar 46 is positioned at a suitable spacing therefrom of, say, approaching half the distance to the tine working ends 12, an appreciably smaller distance is left between the spreader bar 46 and said tine working ends 12, and with the result that the heretofore required, additional, coiled wire or woven rattan support and separator near the tine working ends is not required.

A tighter, more rigid construction is thus achieved hereby without excessive weight increase, and indeed with weight reducing elimination of parts such as the just-mentioned extra wire separator heretofore necessary to keep the teeth of a conventional rake from getting crossed or jammed together.

I claim:
1. In a lawn rake,
  a. a handle;
  b. a triangular spread of teeth,
  said teeth, considered progressively from the center to the opposite sides of the spread, being of gradually increasing extent radially from the spread triangle apex,
  whereby the projecting of all said teeth is to common tangency with the same straight line or vertical plane transverse or normal to said handle, and thereby for raking cleanly from and close against a laterally straight, vertical edge or surface;
  c. downturned working ends integrally formed at the outer ends of said teeth,
  said teeth working ends being all of the same vertical extent or height;
  d. socket head means for durably and securely joining the inner ends of said teeth to said handle, said socket head means comprising
  $d_1$. flat transverse means individually separately engaging and fixing said teeth inner ends in laterally contiguous, co-planar array and with the backs of said teeth parallel-extending therefrom,
  whereby said teeth outer ends also all occupy the same transverse or horizontal plane, and
  whereby with their said working ends all of the same height said teeth uniformly engage the lawn surface when swung through all rake use attitudes of handle inclination thereto;
  $d_2$. thin, flat, transverse, light-weight, rigid plate members, engaged to the opposite sides of said teeth spread and flat transverse means, and extending radially beyond the teeth inner ends to supply to said teeth spread a proper balance as between resiliency and stiffness,
  said plate members formed also to accommodate the positioning of said teeth inner ends, considered progressively from the center to the opposite sides of said teeth spread, at gradually increasing distances radially from said spread triangle apex, whereby said teeth of said triangular spread project to said same straight transverse line with teeth backs all of the same identical length;
  $d_3$. a receptacle for and mounting therewithin one end of said handle, said receptacle integrally formed in said plate members; and
  $d_4$. means securing together said teeth spread, flat transverse means, and plate members.
2. The lawn rake of claim 1, wherein said flat, transverse, teeth inner end engaging means comprise a stiff strip of sheet material, and adhesive means bonding said material to said teeth inner ends to said material.

3. The lawn rake of claim 1, wherein said teeth are separate or individual, unsplit and untwisted and unturned, and fabricatable equally of bamboo or steel.

4. The lawn rake of claim 1, wherein said plate members are stamped and formed from sheet steel.

5. The lawn rake of claim 1, wherein said plate members are of mating male and female construction.

6. The lawn rake of claim 1, wherein said securing together means comprise rivets passed through said plate members, flat transverse means, and teeth spread.

7. The lawn rake of claim 1, wherein said plate members comprise male and female members, the female member having integrating flanges bent back over and pressed against the male member.

8. The lawn rake of claim 1, wherein said plate members extend from the inner radially toward the outer ends of said teeth a distance of approximately 2 in.

9. The lawn rake of claim 1, wherein said plate members are mutually oppositely half-cone indented to form said handle receptacle.

10. The lawn rake of claim 1, wherein one of said plate members has an intermediate step or abutment against which is engaged the inner edge of said flat transverse means said abutment having straight sides diverging at an angle calculatedly differing from the apex angle of the triangular teeth spread such that the teeth extend generally therefrom to the same straight transverse line with backs of the same identical length.

11. The lawn rake of claim 1, and means for retaining a tapered handle end in said receptacle.

12. The lawn rake of claim 1, wherein the female of said plate members is formed out-of-flat to stiffen the same.

13. The lawn rake of claim 12, wherein said female plate member has a stiffening peripheral bead, and stiffening ribs between said bead and the inner end of its handle receiving cone depression.

* * * * *